United States Patent
Miyata

(10) Patent No.: US 9,113,013 B2
(45) Date of Patent: Aug. 18, 2015

(54) RELAYING DEVICE

(71) Applicant: BROTHER KOGYO KABUSHIKI KAISHA, Nagoya-shi, Aichi-ken (JP)

(72) Inventor: Yuji Miyata, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 236 days.

(21) Appl. No.: 13/837,091

(22) Filed: Mar. 15, 2013

(65) Prior Publication Data

US 2014/0016153 A1 Jan. 16, 2014

(30) Foreign Application Priority Data

Jul. 13, 2012 (JP) ................................ 2012-157726

(51) Int. Cl.
G06F 17/30 (2006.01)
H04N 1/00 (2006.01)
H04N 1/21 (2006.01)

(52) U.S. Cl.
CPC ....... H04N 1/00408 (2013.01); H04N 1/00244 (2013.01); H04N 1/2166 (2013.01); H04N 2201/0015 (2013.01); H04N 2201/0039 (2013.01); H04N 2201/0062 (2013.01); H04N 2201/0094 (2013.01)

(58) Field of Classification Search
CPC .......... G06F 17/3028; G06F 17/30265; G06F 3/0486; G06F 3/0482; G06F 17/30115; G06F 2221/2141; G06F 17/30067
See application file for complete search history.

(56) References Cited

U.S. PATENT DOCUMENTS

| 2005/0278331 | A1 | 12/2005 | Hatori |
| 2006/0085474 | A1* | 4/2006 | Tsubono ........................ 707/102 |
| 2008/0244469 | A1* | 10/2008 | Turcotte et al. ............... 715/864 |
| 2011/0289448 | A1* | 11/2011 | Tanaka .......................... 715/781 |
| 2012/0317477 | A1 | 12/2012 | Kotake |

FOREIGN PATENT DOCUMENTS

| JP | 2005-050224 A | 2/2005 |
| JP | 2005-269250 A | 9/2005 |
| JP | 2005-352701 A | 12/2005 |
| JP | 2013-020608 A | 1/2013 |

* cited by examiner

Primary Examiner — Angelica Ruiz
(74) Attorney, Agent, or Firm — Merchant & Gould PC

(57) ABSTRACT

The relaying device may receive folder selecting instruction information from the image processing device. The relaying device may receive folder identifying information and image data identifying information from the server. The relaying device may generate first selection screen data, in a case where it is determined that one or more image data and one or more subfolders are stored in the selected folder. The relaying device may send the first selection screen data to the image processing device. The relaying device may generate second selection screen data in a case where accessing image selecting instruction information is received. The relaying device may send the second selection screen data to the image processing device. The relaying device may execute a process for causing the image processing device to acquire selected image data in a case where image data selecting instruction information is received from the image processing device.

10 Claims, 7 Drawing Sheets

RELAYING DEVICE

CROSS-REFERENCE TO RELATED APPLICATION

This application claims priority to Japanese Patent Application No. 2012-157726, filed on Jul. 13, 2012, the contents of which are hereby incorporated by reference into the present application.

TECHNICAL FIELD

The present specification discloses a relaying device connected with an image processing device and a server via a network.

DESCRIPTION OF RELATED ART

In recent years, an electronic file storing service capable of storing an electronic file in a storage server on a network has been widespread.

SUMMARY

There is a case that a desired electronic file is downloaded to an image processing device from a service providing device for an electronic file storage service. In this case, it is necessary to display a file selection screen on a display unit of the image processing device and let a user to select an electronic file to be downloaded. Furthermore, a display pattern of the file selection screen depends on a file management mechanism employed by the electronic file storage service. Accordingly, in a case where a different file management mechanism is employed for every electronic file storage service, a display pattern of the file selection screen becomes also different for every electronic file storage service, which may impair convenience of a user.

In one aspect of the teachings disclosed herein, a relaying device configured to communicate with an image processing device and a server via a network may be provided.
The server may store various types of data according to a hierarchy structure using a plurality of folders. Each of the plurality of folders may be configured to be able to store a subfolder and image data. The subfolders may be lower layer folders. The relaying device may comprise a processor and an instruction memory. The instruction memory may be configured to store computer-readable instructions therein. The computer-readable instructions, when executed by the processor, may cause the relaying device to perform receiving folder selecting instruction information from the image processing device. The folder selecting instruction information may be information for selecting one folder among the plurality of folders. The computer-readable instructions may cause the relaying device to perform receiving folder identifying information and image data identifying information from the server. The folder identifying information may be information for identifying a subfolder stored in the selected folder of which selection has been instructed by the folder selecting instruction information. The image data identifying information may be information for identifying image data stored in the selected folder. The computer-readable instructions may cause the relaying device to perform generating first selection screen data for causing a display unit of the image processing device to display a first selection screen including a folder image and an accessing image, in a case where it is determined, from the folder identifying information and the image data identifying information received from the server, that one or more image data and one or more subfolders are stored in the selected folder. The folder image may be an image for selecting the one or more subfolders stored in the selected folder. The accessing image may be an image for accessing the one or more image data stored in the selected folder. The computer-readable instructions may cause the relaying device to perform sending the first selection screen data, generated by the generating first selection screen data, to the image processing device. The computer-readable instructions may cause the relaying device to perform generating second selection screen data for causing the display unit of the image processing device to display a second selection screen including a selecting image in a case where accessing image selecting instruction information is received from the image processing device that is a destination of the first selection screen data. The selecting image may be an image for selecting one image data from among the one or more image data stored in the selected folder. The accessing image selecting instruction information may indicate that the accessing image has been selected. The computer-readable instructions may cause the relaying device to perform sending the second selection screen data, generated by the generating second selection screen data, to the image processing device. The computer-readable instructions may cause the relaying device to perform executing a process for causing the image processing device to acquire selected image data in a case where image data selecting instruction information is received from the image processing device that is a destination of the second selection screen data, the image data selecting instruction information indicating that the one image data has been selected.

EMBODIMENT

System Configuration

Figure 1:
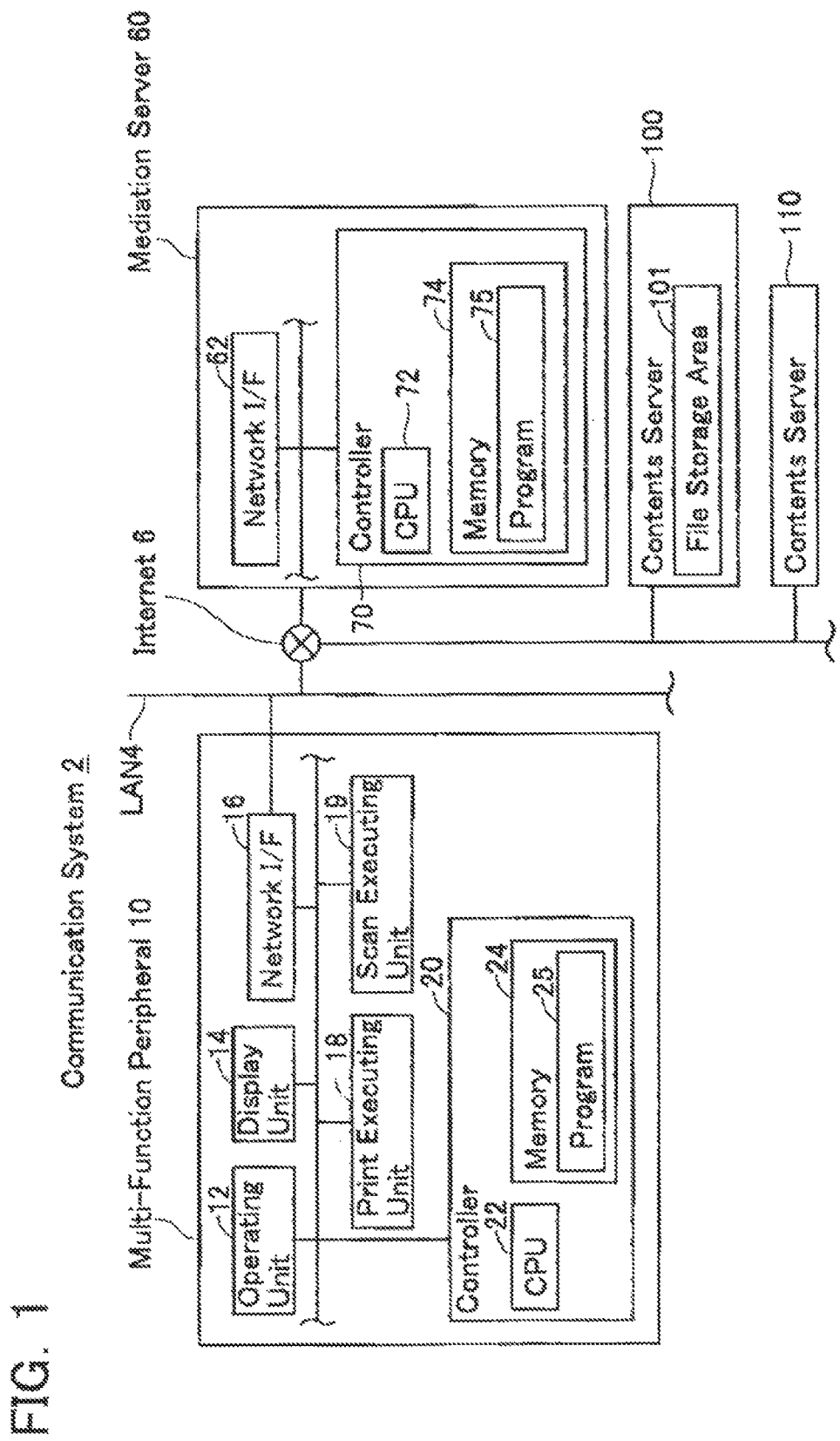
FIG. 1 shows a configuration of a communication system.

As shown in FIG. 1, a communication system 2 includes a multi-function peripheral 10, a mediation server 60, and contents servers 100 and 110. Each of the multi-function peripheral 10 is connected with a LAN 4. The mediation server 60 and the contents servers 100 and 110 are connected with an Internet 6.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24.

(Structure of Mediation Server 60)

The mediation server 60 is a server independent of the multi-function peripheral 10 and the contents servers 100 and 110. The mediation server 60 is a server for mediating supply of image data from the contents servers 100 and 110 to the multi-function peripheral 10. The mediation server 60 is a server provided by a vendor of the multi-function peripheral 10. The mediation server 60 includes a network I/F 62 and a controller 70. The controller 70 includes a CPU 72 and a memory 74. The CPU 72 performs various processing in accordance with a program 75 stored in the memory 74.

(Structure of Contents Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark)", "Google (registered trademark) Docs", "PICASA (registered trademark), "FACEBOOK (registered trademark)", etc. A user of the online service can upload or download various types of data to or from a storage area assigned to the user via the Internet 6.

Figure 2:
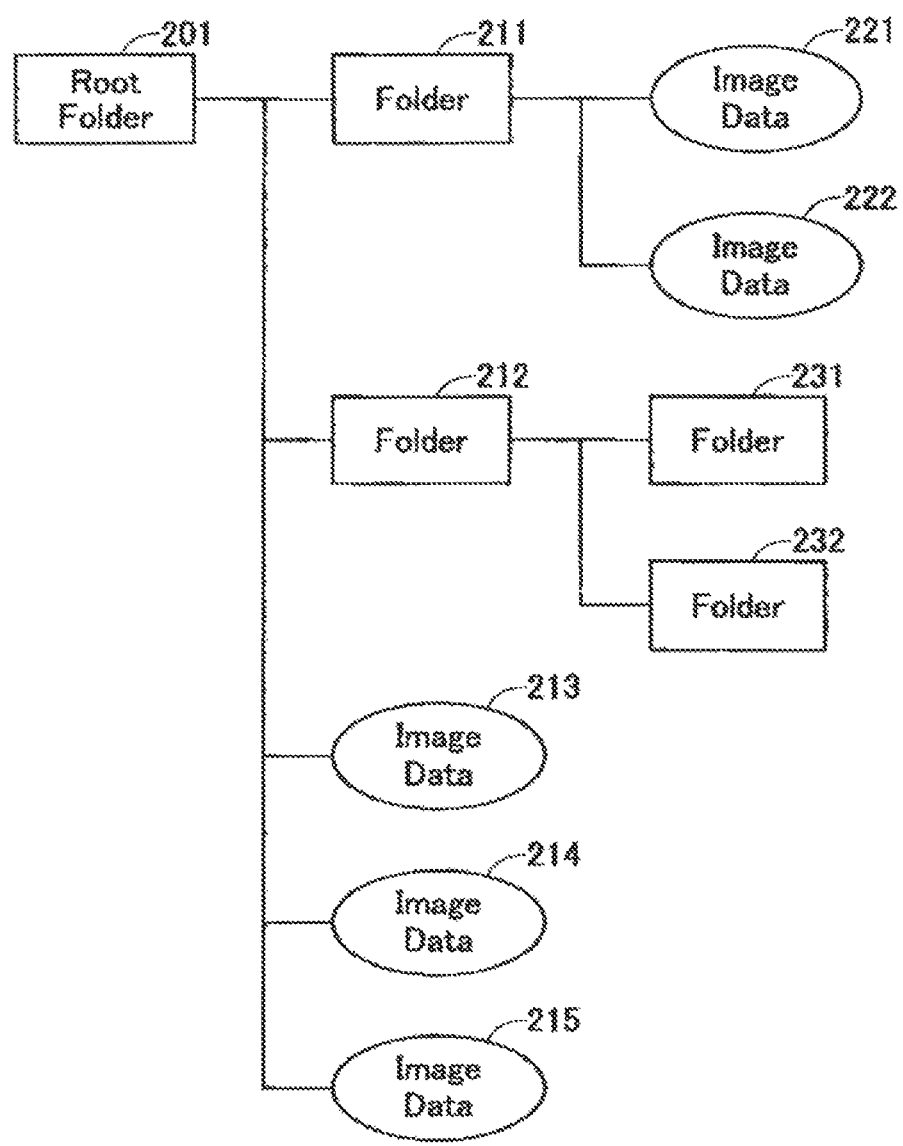
FIG. 2 shows an example of a hierarchy type file structure.

The contents server 100 is equipped with a file storage area 101. The file storage area 101 is an area for storing various types of data. The file storage area 101 has a hierarchy type file structure which is a structure for storing data using a plurality of folders. Each of the plurality of folders is capable of storing subfolders which are lower layer folders and various types of data. FIG. 2 shows an example of the hierarchy type file structure of the file storage area 101. As shown in FIG. 2, the file storage area 101 stores various types of data with a hierarchy type file structure using a plurality of folders. Specifically, folders 211 and 212, and image data 213 to 215 are stored in a root folder 201. The root folder 201 is a folder of the highest layer in the hierarchy type file structure. Image data 221 and 222 is stored in the folder 211. Folders 231 and 232 are stored in the folder 212. In this manner, in the hierarchy type file structure of the file storage area 101, both of folders and image data may be stored in a same folder.

Note that a folder is a unit for logically allocating a plurality of image data stored in the file storage area 101. It is not necessary that the plurality of image data allocated in a same folder is stored in physically consecutive storage areas. Furthermore, it is not necessary that the plurality of image data allocated in a same folder is stored in a same directory in a file system of the contents server 100. Even when the plurality of image data allocated in a same folder is stored in different directories in the file system of the contents server 100, when a machine on a side of user of the online service such as the multi-function peripheral 10 accesses the contents server 100, the contents server 100 sends, to the machine on the side of user, information indicating that the plurality of image data is stored in a same folder.

Furthermore, image data stored in the file storage area 101 may be data having various formats. For example, the image data may have a format for reproducing one image. The image data as above includes image data of JPEG format, image data of EXIF format, image data of PNG format, image data of BMP format, etc. Furthermore, the image data may have a format for reproducing a plurality of pages of images. The image data as above includes image data of PDF format, image data of TIFF format, etc. Furthermore, the image data may be data of a document file type generated by a document preparation application such as Microsoft Word (registered trademark). The imaged data may also be data of a presentation file format generated by a presentation application such as Microsoft Power Point (registered trademark). Note that a structure of the contents server 110 is similar to that of the contents server 100, so that the description will be omitted.

(Role of Mediation Server 60)

A business operator providing the contents server discloses a dedicated API (abbreviation of Application Program Interface) for requiring a reply of a folder name of a folder stored in the contents server or a file name of image data stored in the contents server. When the multi-function peripheral supports an API of the contents server, the multi-function peripheral can require a reply of information of the contents server. When specification of the API is changed, it becomes necessary to update software of the multi-function peripheral to support the changed API. However, it is painful for the user to update the software of the multi-function peripheral that is already operating. Accordingly, in the embodiment, the mediation server 60 is provided in order that the multi-function peripheral 10 can download data from the contents server even when the multi-function peripheral 10 does not support the API of the contents server. That is, the mediation server 60 supports the API for requiring a reply of a folder name of a folder stored in the contents server or a file name of image data stored in the contents server. Furthermore, there is a case in that a plurality of contents servers of different types is connected to the Internet. Furthermore, the business operator providing each contents server discloses a dedicated API (abbreviation of Application Program Interface) to download data from the contents server. It is necessary for the multi-function peripheral 10 to support APIs of a plurality of contents servers in order to download data from the respective contents servers, so that it is necessary to store a number of programs. However, storage capacity of a memory of the multi-function peripheral 10 is small as compared with a PC, etc.

Accordingly, in the embodiment, the mediation server 60 is provided so that the multi-function peripheral 10 can download data from each of the plurality of contents servers without storing a number of programs in the multi-function peripheral 10. That is, the mediation server 60 supports a plurality of APIs for the plurality of respective contents servers. Then, in a state where the multi-function peripheral 10 downloads data from a specific contents server (for example, the contents server 100) among the plurality of contents servers, the mediation server 60 uses an API for the specific contents server to perform various communications to be described below (for example, communication of each information in S13, S53, S73 illustrated in FIG. 3) with the specific contents server. Herewith, the multi-function peripheral 10 can download data from the specific contents server even when the multi-function peripheral 10 does not support the API for the specific contents server.

(Operations of Multi-Function Peripheral, Mediation Server, and Contents Server)

(First Case)

Figure 3:
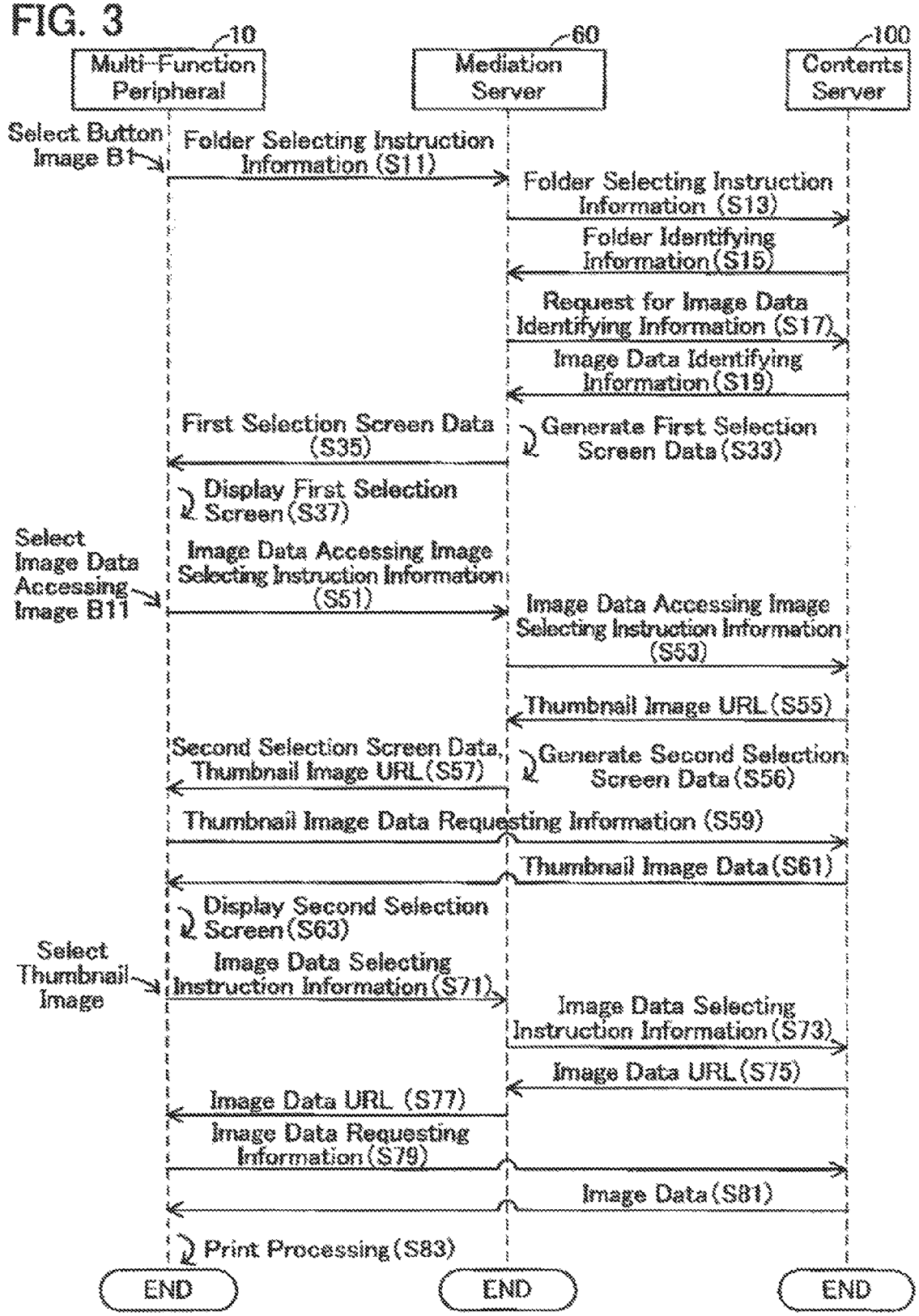
FIG. 3 is a sequence diagram of processing executed by devices in a first case.

Each operation of the multi-function peripheral 10, mediation server 60, and contents server 100 in a first case will be described using a sequence diagram of FIG. 3. In FIG. 3, operations in a case where both of a subfolder and image data are stored in a selected folder are illustrated.

Figure 6:
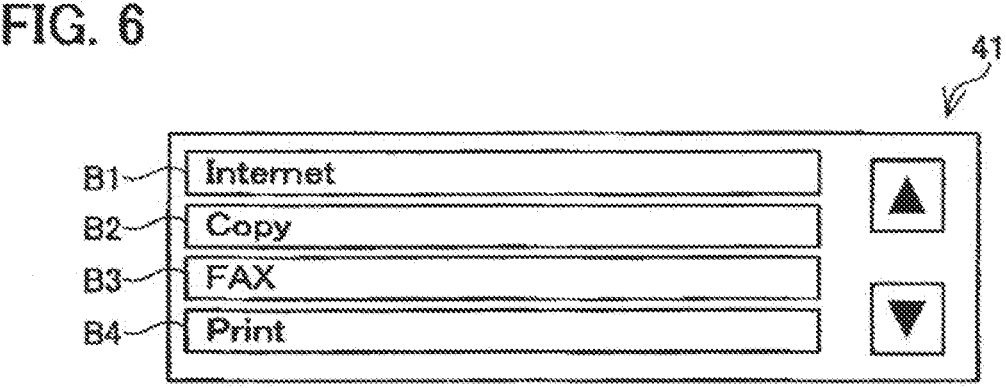
FIG. 6 shows a display example of a main screen.

Upon receiving an order for displaying a main screen, the CPU 22 of the multi-function peripheral 10 cause the display unit 14 to display the main screen. The order for displaying the main screen may be input from the operating unit 12 by a user. Data for displaying the main screen 41 may be preliminarily stored in the memory 24. An example of the main screen 41 is shown in FIG. 6. The main screen 41 includes button images B1 to B4. The button images B1 to B4 are images for receiving an input of an execution order among a plurality of functions. The functions accepted by the button images B1 to B4 are an Internet function, a Copy function, a FAX function, and a Print function, respectively.

In an illustrative example of the first case, a case will be described in which the button image B1 is selected by a user in order to download image data from the contents server 100. In this case, the CPU 22 of the multi-function peripheral 10 sends folder selecting instruction information to the mediation server 60 in S11 of FIG. 3. The folder selecting instruction information is information for instructing a selected folder, which is a folder selected among a plurality of folders. In S11, a case where the multi-function peripheral 10 accesses the contents server 100 for the first time is described, so that the selected folder is the root folder 201 among the hierarchy type file structure illustrated in FIG. 2. Upon receiving the folder selecting instruction information from the multi-function peripheral 10, the CPU 72 of the mediation server 60 sends the folder selecting instruction information to the contents server 100 in S13.

Upon receiving folder selecting instruction information from the mediation server 60, the contents server 100 sends folder identifying information for identifying a subfolder stored in the selected folder to the mediation server 60 in S15. The folder identifying information includes, for example, a folder name of a folder stored in the selected folder. Alternatively, when a folder is not stored in the selected folder, folder identifying information indicating that no folder is stored may be sent to the mediation server 60. In the illustrative example of the first case, folder names of the folders 211 and 212 stored in the root folder 201 are sent to the mediation server 60.

In S17, the CPU 72 of the mediation server 60 sends a request for image data identifying information to the contents server 100. The image data identifying information is information for identifying image data stored in the selected folder. The image data identifying information includes, for example, a file name of image data stored in the selected folder, and the number of data of image data stored in the selected folder. Upon receiving the request for image data identifying information, the contents server 100 sends image data identifying information for identifying image data stored in the selected folder to the mediation server 60 in S19. In the illustrative example of the first case, file names of image data 213 to 215 stored in the root folder 201 are sent to the mediation server 60.

In S33, the CPU 72 of the mediation server 60 determines, based on the folder identifying information and the image data identifying information obtained from the contents server 100, whether or not one or more image data and one or more subfolders are stored in the selected folder. When it is determined that one or more image data and one or more subfolders are stored, the CPU 72 generates first selection screen data for displaying a first selection screen on the display unit 14 of the multi-function peripheral 10. The first selection screen includes one or more folder images and one or more image data accessing images. In the illustrative example of the first case, a case is illustrated in which the folders 211 and 212 and the image data 213 to 215 are stored in the root folder 201 which is the selected folder. Accordingly, the CPU 72 of the mediation server 60 generates first selection screen data including folder images and image data access images. In S35, the CPU 72 of the mediation server 60 sends the first selection screen data to the multi-function peripheral 10.

Figure 7:
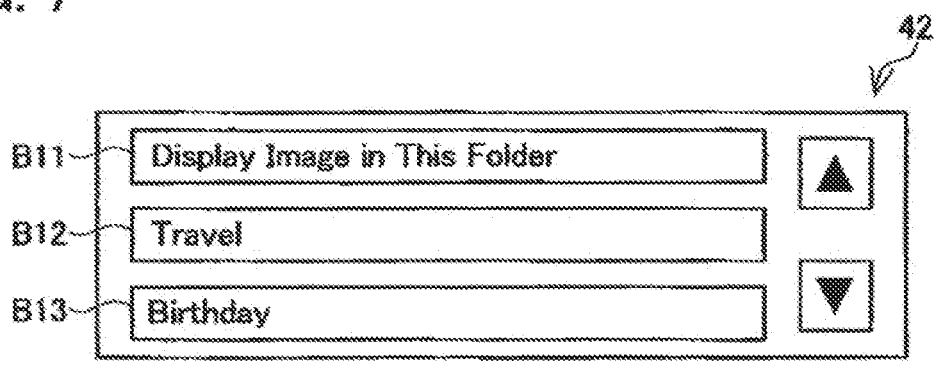
FIG. 7 shows a display example of a first selection screen.

In S37, the CPU 22 of the multi-function peripheral 10 causes the display unit 14 to display a first selection screen 42 based on the first selection screen data received from the mediation server 60. FIG. 7 shows a display example of the first selection screen 42. In the display example of FIG. 7, an image data accessing image B11 and folder images B12 and B13 are displayed on the first selection screen 42. The image data accessing image B11 is an image for accessing to the image data 213 to 215 stored in the root folder 201 which is the selected folder. The folder images B12 and B13 are images for selecting folders 211 and 212 respectively stored in the root folder 201 which is the selected folder. That is, when both of the subfolder and the image data are stored in the selected folder, an image data accessing image is added to the first selection screen data in addition to a folder image. A display pattern of the image data accessing image B11 is similar to display patterns of the folder images B12 and B13. Furthermore, in the first selection screen 42, the image data accessing image B11 and the folder images B12 and B13 are displayed on the display unit 14 in a scrollable manner.

In the first selection screen 42, the image data accessing image B11 is disposed uppermost in the scroll lines. Accordingly, the image data accessing image B11 can be displayed on the display unit 14 without fail at a first stage in which displaying of the first selection screen 42 on the display unit 14 is started. The first stage is a stage in which the CPU 22 of the multi-function peripheral 10 causes the display unit 14 to display the first selection screen 42 for the first time based on the first selection screen data received from the mediation server 60 in S37. Accordingly, even when the number of the folder images is too large to be displayed at once in a display area of the display unit 14 of the multi-function peripheral 10, the image data accessing image can be displayed on the display unit 14 without fail without the need of scrolling. Consequently, the user can easily find the image data accessing image.

The user selects a button image to access the data which is to be downloaded among the first selection screen 42 by operating the operating unit 12. In the illustrative example of the first case, an example in which a case where the user selects the image data accessing image B11 to download the image data 213 will be subsequently described. In S51, the CPU 22 of the multi-function peripheral 10 sends image data accessing image selecting instruction information to the mediation server 60. The image data accessing image selecting instruction information is information indicating that the image data accessing image B11 which is one of the image data accessing images has been selected. In S53, upon receiving the image data accessing image selecting instruction information from the multi-function peripheral 10, the CPU 72 of the mediation server 60 sends the image data accessing image selecting instruction information to the contents server 100.

Upon receiving the image data accessing image selecting instruction information from the mediation server 60, the contents server 100 first specifies the selected folder specified by the image data accessing image selecting instruction information by referring the file storage area 101. Then, the contents server 100 specifies a thumbnail image URL to access a thumbnail image of every image data included in the selected folder. Herein, the thumbnail image is an image in which image data is reduced for a sample. In S55, the contents server 100 sends the thumbnail image URL to the mediation server 60. In the illustrative example of the first case, the thumbnail image URL for the image data 213 to 215 included in the root folder 201 which is the selected folder is sent to the mediation server 60.

In S56, the CPU 72 of the mediation server 60 generates second selection screen data for displaying a second selection screen on the display unit 14 of the multi-function peripheral 10. The second selection screen includes a thumbnail image. The thumbnail image is an image for selecting each of image data stored in the selected folder. The second selection screen data is data showing a layout when the thumbnail image is displayed on the display unit 14. The CPU 72 of the mediation server 60 sends the second selection screen data and the thumbnail image URL to the multi-function peripheral 10 in S57.

In S59, the CPU 22 of the multi-function peripheral 10 sends thumbnail image data requesting information to the contents server 100 not via the mediation server 60. The thumbnail image data requesting information is information including the thumbnail image URL. In S61, the contents server 100 sends thumbnail image data specified by the thumbnail image URL included in the thumbnail image data requesting information to the multi-function peripheral 10 not via the mediation server 60. In this manner, the multi-function peripheral 10 is capable of obtaining the thumbnail image data specified by the thumbnail image URL not via the mediation server 60.

Figure 8:
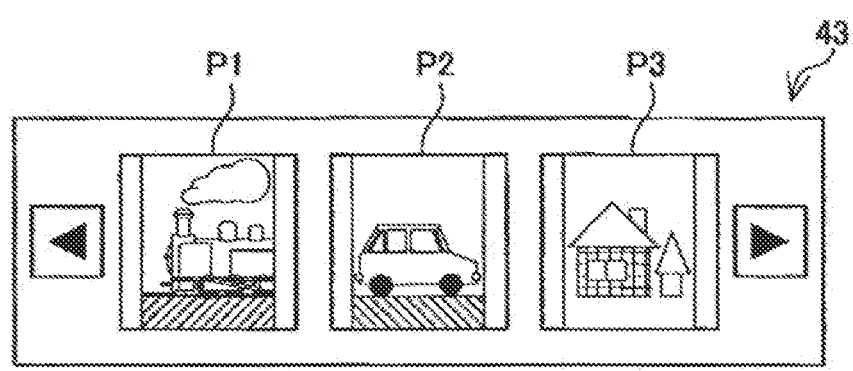
FIG. 8 shows a display example of a second selection screen.

In S63, the CPU 22 of the multi-function peripheral 10 causes the display unit 14 to display a second selection screen 43 based on the second selection screen data received from the mediation server 60 and the thumbnail image data downloaded from the contents server 100. A display example of the second selection screen 43 is illustrated in FIG. 8. In the display example of FIG. 8, thumbnail images P1 to P3 are displayed in the second selection screen 43. The thumbnail images P1 to P3 are images for accessing image data 213 to 215, respectively, stored in the root folder 201 which is the selected folder. In this manner, in the illustrative example of the first case, when the image data accessing image B11 is selected in the first selection screen 42 of FIG. 7, the thumbnail images P1 to P3 of the image data 213 to 215 stored in the root folder 201 are displayed as shown in FIG. 8.

The user operates the operating unit 12 to select at least one thumbnail image in the second selection screen 43. When a thumbnail image is selected by the user, the CPU 22 of the multi-function peripheral 10 sends image data selecting instruction information to the mediation server 60 in S71. The image data selecting instruction information is information indicating which one of the image data is selected in the multi-function peripheral 10. The image data selecting instruction information may be a file name of image data corresponding to the thumbnail image selected by the user. Upon receiving the image data selecting instruction information from the multi-function peripheral 10, the CPU 72 of the mediation server 60 sends the image data selecting instruction information to the contents server 100 in S73. In the illustrative example of the first case, the description will be continued as an example in which the user selects the thumbnail image P1 in order to download the image data 213.

Upon receiving the image data selecting instruction information from the mediation server 60, the contents server 100 sends the image data URL, which is the URL of the image data corresponding to the file name of the image data included in the image data selecting instruction information, to the mediation server 60 in S75. That is, the image data URL is an URL of the image data corresponding to the thumbnail image selected by the user. In the illustrative example of the first case, the image data URL of image data 213 corresponding to the thumbnail image P1 is sent to the mediation server 60. Upon receiving the image data URL from the contents server 100, the CPU 72 of the mediation server 60 sends the image data URL to the multi-function peripheral 10 in S77.

Upon receiving the image data URL from the mediation server 60, the CPU 22 of the multi-function peripheral 10 sends image data requesting information to the contents server 100 not via the mediation server 60 in S79. The image data requesting information is information including the image data URL. Upon receiving the image data requesting information from the multi-function peripheral 10, the contents server 100 sends image data specified by the image data URL included in the image data requesting information to the multi-function peripheral 10 not via the mediation server 60 in S81. In the illustrative example of the first case, the image data 213 is sent to the multi-function peripheral 10. In this manner, the multi-function peripheral 10 is capable of obtaining the image data specified by the image data URL not via the mediation server 60.

Upon downloading the image data from the contents server 100, the CPU 22 of the multi-function peripheral 10 causes the print executing unit 18 to execute print processing using the downloaded image data in S83. In the illustrative example of the first case, an image expressed by the image data 213 is printed.

(Second Case)

Respective operations of the multi-function peripheral 10, the mediation server 60, and the contents server 100 in a second case will be described by using a sequence diagram of FIG. 4. In the second case, operations where a folder in which only a subfolder is stored is selected as a selected folder will be described. In the illustrative example of the second case, an operation where the folder image B13 is selected in the first selection screen 42 of FIG. 7 will be described. In this case, the folder 212 shown in FIG. 2 is to be selected as the selected folder. Note that, operations from S11 to S19 in FIG. 4 in the second case are similar to the operations from S1 to S19 in FIG. 3 in the first case, so that the description will be omitted.

Figure 4:
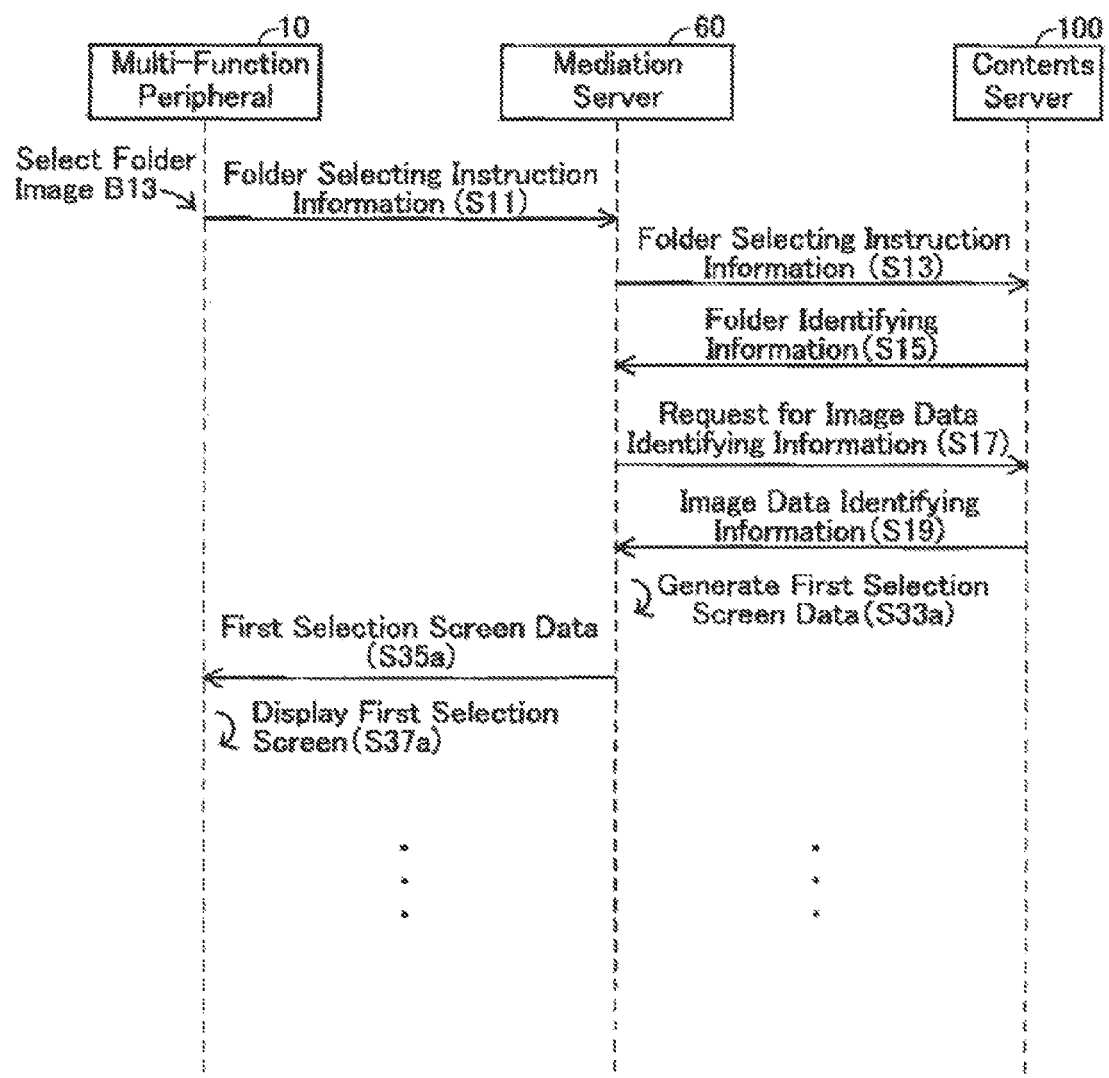
FIG. 4 is a sequence diagram of processing executed by devices in a second case.

In S33a of FIG. 4, the CPU 72 of the mediation server 60 determines that no image data is stored and only the folders 231 and 232 are stored in the folder 212 which is the selected folder. Accordingly, the CPU 72 generates first selection screen data including the folder images of the respective folders 231 and 232. The CPU 72 of the mediation server 60 sends the first selection screen data to the multi-function peripheral 10 in S35a.

Figure 9:
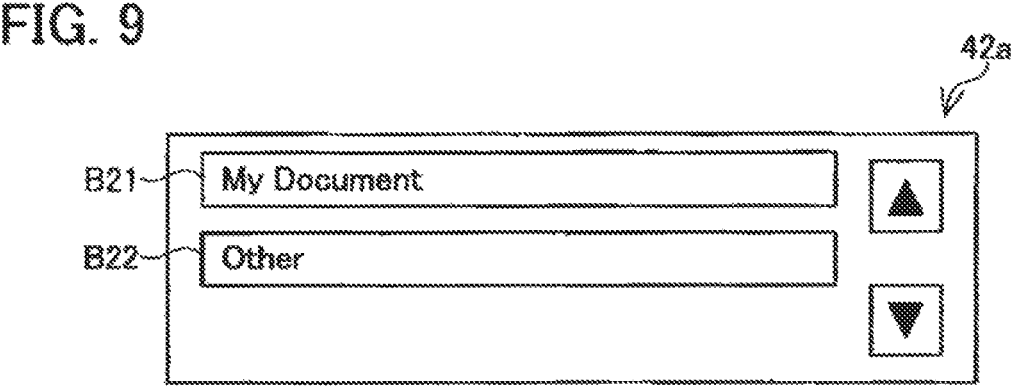
FIG. 9 shows a display example of the first selection screen.

In S37a, the CPU 22 of the multi-function peripheral 10 causes the display unit 14 to display a first selection screen 42a based on the first selection screen data received from the mediation server 60. FIG. 9 illustrates a display example of the first selection screen 42a. In the display example of FIG. 9, folder images B21 and B22 are displayed in the first selection screen 42a. The folder images B21 and B22 are images for selecting the folders 231 and 232, respectively, stored in the folder 212. That is, when only subfolders are stored in the selected folder, only folder images are displayed in the first selection screen.

(Third Case)

Figure 5:
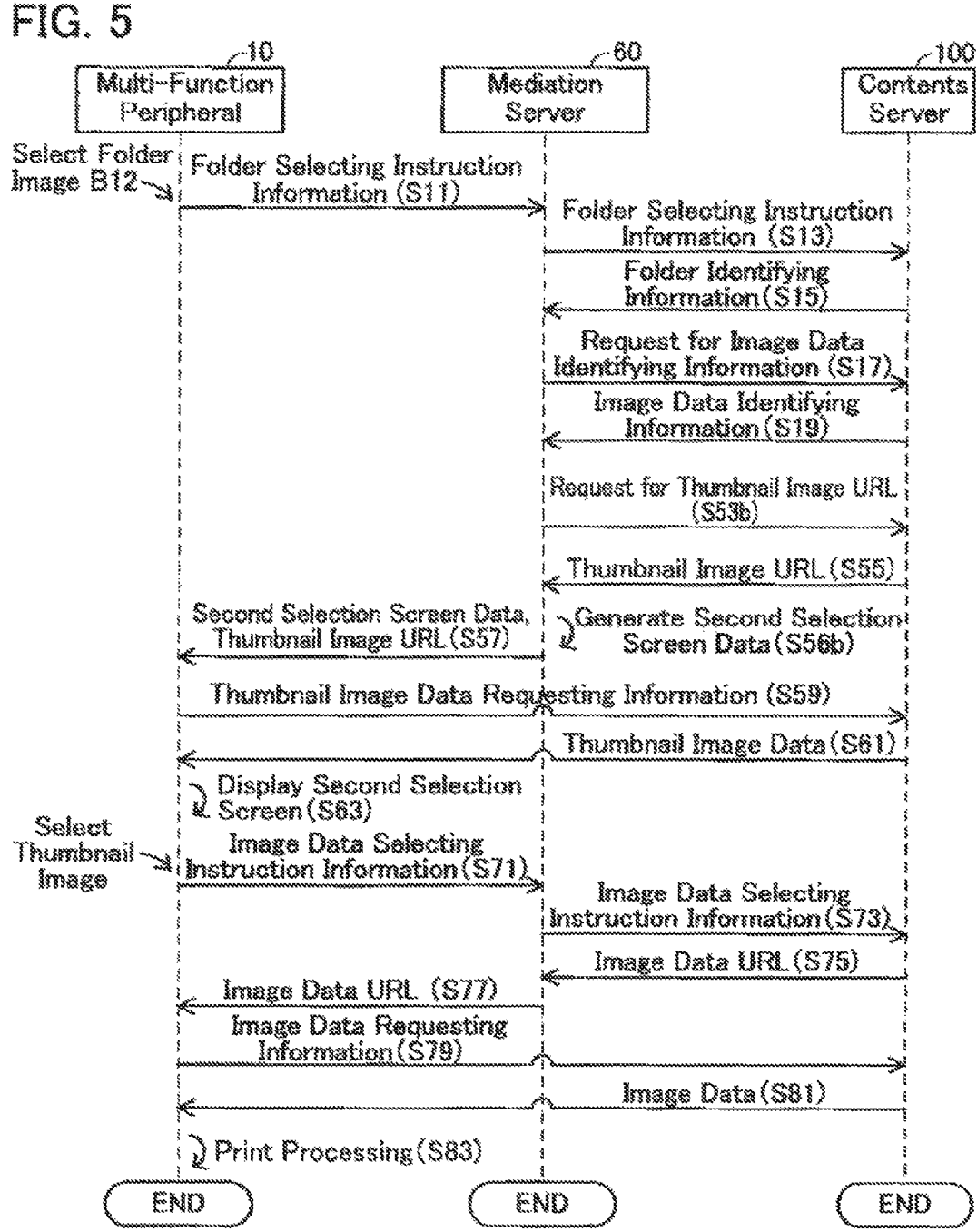
FIG. 5 is a sequence diagram of processing executed by devices in a third case.

Respective operations of the multi-function peripheral 10, the mediation server 60, and the contents server 100 in a third case will be described by using a sequence diagram of FIG. 5. In the third case, operations when a folder in which only image data is stored is selected as a selected folder will be described. In the illustrative example of the third case, operations in a case where the folder image B12 is selected in the first selection screen 42 of FIG. 7 will be described. In this case, the folder 211 shown in FIG. 2 is to be selected as the selected folder. Note that the operations of S11 to S19 in FIG. 5 in the third case are similar to the operations of S11 to S19 of FIG. 3 in the first case, so that the description will be omitted.

The CPU 72 of the mediation server 60 determines that only the image data 221 and 222 is stored in the selected folder based on the folder identifying information received in S15 and the image data identifying information received in S19. Accordingly, the CPU 72 sends a request for a thumbnail image URL of the image data 221 and 222 to the contents server 100 in S53b. In S55, the contents server 100 sends the thumbnail image URL of the image data 221 and 222 to the mediation server 60. In S56b, the CPU 72 of the mediation server 60 generates second selection screen data for displaying a second selection screen including thumbnail images on the display unit 14 of the multi-function peripheral 10. In S57, the CPU 72 of the mediation server 60 sends the second selection screen data and the thumbnail image URL to the multi-function peripheral 10. Operations of S59 and subsequent steps in FIG. 5 are similar to the operations of S59 and subsequent steps in FIG. 3 in the first case, so that the description will be omitted.

(Effects)

When both of the subfolder and image data are stored in the selected folder, it is possible to display a first selection screen including an image data accessing image on the display unit 14 of the multi-function peripheral 10 instead of a thumbnail image expressing image data (S37, FIG. 7). The image data accessing image is an image for accepting a request to access image data. Then, when the request to access image data is accepted in accordance with the selection of the image data accessing image, it is possible to display a second selection screen including thumbnail images for selecting each of image data on the display unit 14 of the multi-function peripheral 10 (S63, FIG. 8). With this configuration, control can be achieved such that no thumbnail image data is obtained by the multi-function peripheral 10 when a user does not access image data. Since a size of the thumbnail image data is larger than that of the image data identifying information, it becomes possible to reduce data communication load. Furthermore, it becomes unnecessary to obtain thumbnail image data when displaying the first selection screen. Accordingly, it is possible to prevent the occurrence of slow displaying of the first selection screen due to the fact that it takes a lot of time to complete obtaining the thumbnail image data. When both of a subfolder and image data are stored in the selected folder, the number of image data is generally larger. In the mediation server 60 described in the present specification, since one image data accessing image is displayed in the first selection screen as a representative of the plurality of image data, an amount of information to be displayed in the first selection screen can be reduced. Accordingly, since a display content of the first section screen can be easily understood by the user, visibility of a user interface can be improved.

The mediation server 60 described in the present specification can unify display patterns of the image data accessing image and the folder image (S37, FIG. 7). This enables to unify a method of selecting image data accessing image and a method of selecting folder image, so that operability can be enhanced.

In the mediation server 60 described in the present specification, a display pattern of the first selection screen in a case where a folder in which a subfolder and image data are stored is selected as a selected folder (first case, FIG. 7), and a display pattern of a first selection screen in a case where a folder in which only subfolders are stored is selected as a selected folder (second case, FIG. 9) can be unified. Herewith, a folder in which both of a subfolder and image data are stored and a folder in which only one of the subfolder and image data is stored can be treated in a same manner, so that convenience of a user can be enhanced.

In the mediation server 60 described in the present specification, when it is determined that no subfolder is stored in the selected folder, the multi-function peripheral 10 is capable of rapidly obtaining thumbnail image data (third case, S53b). This enables to shorten a waiting time until a catalog of thumbnail images is displayed in the multi-function peripheral 10.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

(Modifications)

Figure 10:
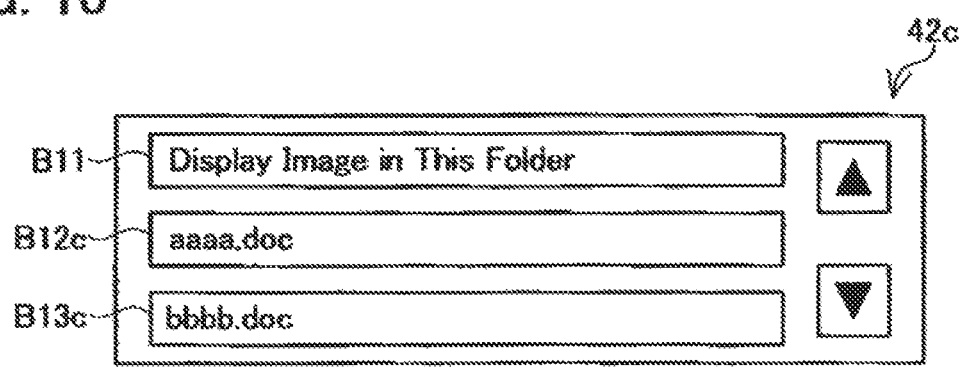
FIG. 10 shows a display example of the first selection screen.

An applicable scope of the technique described in the present specification is not limited to a case where both of a subfolder and image data are stored in a same selected folder. The technique described in the present specification can be used also in a case where specific data which is data of a specific type (for example, document data) and image data are both stored in a same selected folder. In this case, in S17 of FIG. 3, the CPU 72 of the mediation server 60 sends a request for specific data identifying information to the contents server 100. Then, the specific data identifying information is received from the contents server 100 in S19. The specific data identifying information is information for identifying specific data stored in a selected folder (for example, file name of the specific data). In S37, the CPU 22 of the multi-function peripheral 10 displays a first selection screen 42c on the display unit 14. FIG. 10 illustrates a display example of the first selection screen 42c. In the display example of FIG. 10, an image data accessing image B11 and document data images B12c and B13c are displayed. The document data images B12c and B13c are images for selecting document data stored in the selected folder. That is, an image data accessing image is added in addition to a document data image when both of the document data and image data are stored in the same selected folder.

Figure 11:
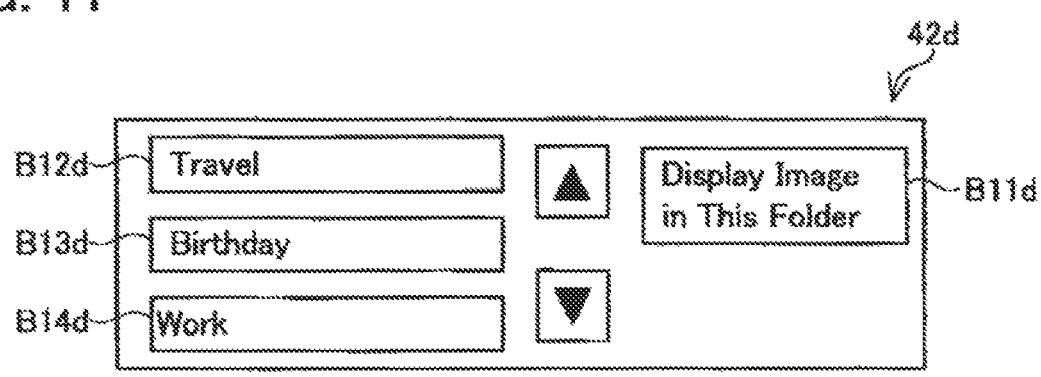
FIG. 11 shows a display example of the first selection screen.

A display pattern of the image data accessing image in the first selection screen may be various patterns. For example, as illustrated in a display example of a first selection screen 42d in FIG. 11, folder images B12d to B14d may be displayed in a scrollable manner and an image data accessing image B11d may be displayed in a non scrollable manner. Herewith, even when a folder image is scrolled, the image data accessing image B11d can be always displayed on the display unit 14 of the multi-function peripheral 10. Herewith, the user can easily find the image data accessing image B11d.

The folder identifying information for identifying a subfolder stored in the selected folder is not limited to folder name, and may be various pieces of information. For example, flag information indicating whether a subfolder is stored in the selected folder may be used as the folder identifying information.

In S15, a pattern for displaying a main screen on the display unit 14 may be various patterns. For example, when an order for displaying the main screen is input by a user from the operating unit 12, the multi-function peripheral 10 may access the mediation server 60. The mediation server 60 may generate main screen data for displaying the main screen and send the main screen data to the multi-function peripheral 10. Then, the multi-function peripheral 10 may display the main screen based on the main screen data.

In S61 or S81, a mode of downloading thumbnail image data and image data from the contents server to the multi-function peripheral 10 may be various modes. For example, a mode may be employed in which thumbnail image data and image data is downloaded via the mediation server 60.

Various types of information may be used for the folder selecting instruction information in S11, image data accessing image selecting instruction information in S51, and image data selecting instruction information in S71. For example, ID information corresponding to selected folder or selected image data, and identification number of selected folder or selected image data may be used.

The mediation server 60 and the contents server 100 may be a united server. Furthermore, in the embodiment, the description is made in which the contents server 100 is connected to the Internet 6, but a plurality of contents servers may be connected to the Internet 6.

The second selection screen is not limited to a pattern including thumbnail images as shown in FIG. 8. For example, the second selection screen may be a pattern of displaying a catalog of file names of image data.

In the embodiment, the case is described in which the CPUs 22 and 72 of the multi-function peripheral 10 and the mediation server 60 execute processing according to software, but is not limited thereto. At least a part of functions provided according to the software may be provided by hardware such as a logic circuit.

The invention claimed is:

1. A relaying device configured to communicate with an image processing device and a server via a network,
   the server configured to store various types of data according to a hierarchy structure using a plurality of folders,
   each of the plurality of folders configured to store a subfolder and image data, the subfolder being a lower layer folder,
   the relaying device comprising:
   a processor; and
   an instruction memory configured to store computer-readable instructions therein, the computer-readable instructions, when executed by the processor, causing the relaying device to perform:
   receiving folder selecting instruction information from the image processing device,
   the folder selecting instruction information being information for selecting one folder among the plurality of folders;
   receiving folder identifying information and image data identifying information from the server,
   the folder identifying information being information for identifying a subfolder stored in the selected folder of which selection has been instructed by the folder selecting instruction information, and
   the image data identifying information being information for identifying image data stored in the selected folder,
   generating first selection screen data for causing a display unit of the image processing device to display a first selection screen including a folder image and an accessing image, in a case where it is determined, from the folder identifying information and the image data identifying information received from the server, that one or more image data and one or more subfolders are stored in the selected folder,
   the folder image being an image for selecting the one or more subfolders stored in the selected folder,
   the accessing image being an image for accessing the one or more image data stored in the selected folder;
   sending the first selection screen data, generated by the generating first selection screen data, to the image processing device;
   generating second selection screen data for causing the display unit of the image processing device to display a second selection screen including a selecting image in a case where accessing image selecting instruction information is received from the image processing device that is a destination of the first selection screen data,
   the selecting image being an image for selecting particular image data from among the one or more image data stored in the selected folder, and
   the accessing image selecting instruction information indicating that the accessing image has been selected;
   sending the second selection screen data, generated by the generating second selection screen data, to the image processing device; and
   executing a process for causing the image processing device to acquire the particular image data in a case where image data selecting instruction information is received from the image processing device that is a destination of the second selection screen data, the image data selecting instruction information indicating that the particular image data has been selected.

2. The relaying device as in claim 1, wherein
   the selecting image is a thumbnail image,
   the second selection screen data is data that represents a layout for the thumbnail image that is displayed in the display unit of the image processing device, and
   the sending the second selection screen data includes executing a process for causing the image processing device to acquire thumbnail image data representing the thumbnail image.

3. The relaying device as in claim 1, wherein
   the generating second selection screen data includes generating the second selection screen data for causing the display unit of the image processing device to display the second selection screen, in a case where it is determined, from the folder identifying information and the image data identifying information received from the server, that the one or more subfolders are not stored in the selected folder but the one or more image data are stored in the selected folder, and
   the sending the second selection screen data includes sending the second selection screen data generated by the generating second selection screen data to the image processing device.

4. The relaying device as in claim 1, wherein
   the computer-readable instructions further cause the image processing device to perform:
   generating third selection screen data for causing the display unit of the image processing device to display a third selection screen including the folder image, in a case where it is determined, from the folder identifying information and the image data identifying information received from the server, that the one or more image data are not stored in the selected folder but the one or more subfolders are stored in the selected folder, and sending the third selection screen data, generated by the generating third selection screen data, to the image processing device.

5. The relaying device as in claim 1, wherein
the accessing image has a display pattern similar to that of the folder image used for selecting the subfolder.

6. The relaying device as in claim 1, wherein
the receiving folder identifying information and image data identifying information further includes receiving specific data identifying information from the server,
the specific data identifying information identifies specific data of which data type is other than the image data, the specific data being stored in the selected folder, and
the generating first selection screen data includes generating the first selection screen data for causing the display unit of the image processing device to display the first selection screen including the accessing image, in a case where it is determined, from the image data identifying information and the specific data identifying information received from the server, that the one or more image data or one or more specific data are stored in the selected folder.

7. The relaying device as in claim 1, wherein
the first selection screen data is data for causing the display unit of the image processing device to display the folder image and the accessing image such that the folder image and the accessing image can be scrolled,
the first selection screen data is data for displaying the first selection screen including the accessing image at an initial phase of starting the display of the first selection screen in the display unit.

8. The relaying device as in claim 1, wherein
the first selection screen data is data for causing the display unit of the image processing device to display images representing subfolders such that the images can be scrolled and to display the accessing image such that the accessing image cannot be scrolled.

9. A non-transitory computer-readable storage medium storing a computer program for a relaying device configured to communicate with an image processing device and a server via a network,
the server configured to store various types of data according to a hierarchy structure using a plurality of folders,
each of the plurality of folders configured to store a subfolder and image data, the subfolder being a lower layer folder,
the computer program including instructions for causing a processor of the relaying device to operate as:
receiving folder selecting instruction information from the image processing device,
the folder selecting instruction information being information for selecting one folder among the plurality of folders;
receiving folder identifying information and image data identifying information from the server,
the folder identifying information being information for identifying a subfolder stored in the selected folder of which selection has been instructed by the folder selecting instruction information, and
the image data identifying information being information for identifying image data stored in the selected folder,
generating first selection screen data for causing a display unit of the image processing device to display a first selection screen including a folder image and an accessing image, in a case where it is determined, from the folder identifying information and the image data identifying information received from the server, that one or more image data and one or more subfolders are stored in the selected folder,
the folder image being an image for selecting the one or more subfolders stored in the selected folder,
the accessing image being an image for accessing the one or more image data stored in the selected folder,
sending the first selection screen data, generated by the generating first selection screen data, to the image processing device;
generating second selection screen data for causing the display unit of the image processing device to display a second selection screen including a selecting image in a case where accessing image selecting instruction information is received from the image processing device that is a destination of the first selection screen data,
the selecting image being an image for selecting one image data from among the one or more image data stored in the selected folder, and
the accessing image selecting instruction information indicating that the accessing image has been selected;
sending the second selection screen data, generated by the generating second selection screen data, to the image processing device; and
executing a process for causing the image processing device to acquire selected image data in a case where image data selecting instruction information is received from the image processing device that is a destination of the second selection screen data, the image data selecting instruction information indicating that the one image data has been selected.

10. A method for controlling a relaying device configured to communicate with an image processing device and a server via a network,
the server configured to store various types of data according to a hierarchy structure using a plurality of folders,
each of the plurality of folders configured to store a subfolder and image data, the subfolder being a lower layer folder,
the method comprising:
receiving folder selecting instruction information from the image processing device,
the folder selecting instruction information being information for selecting one folder among the plurality of folders;
receiving folder identifying information and image data identifying information from the server,
the folder identifying information being information for identifying a subfolder stored in the selected folder of which selection has been instructed by the folder selecting instruction information, and
the image data identifying information being information for identifying image data stored in the selected folder;
generating first selection screen data for causing a display unit of the image processing device to display a first selection screen including a folder image and an accessing image, in a case where it is determined, from the folder identifying information and the image data identifying information received from the server, that one or more image data and one or more subfolders are stored in the selected folder,
the folder image being an image for selecting the one or more subfolders stored in the selected folder,
the accessing image being an image for accessing the one or more image data stored in the selected folder;
sending the first selection screen data, generated by the generating first selection screen data, to the image processing device;
generating second selection screen data for causing the display unit of the image processing device to display a second selection screen including a selecting image in a case where accessing image selecting instruction information is received from the image processing device that is a destination of the first selection screen data,
the selecting image being an image for selecting one image data from among the one or more image data stored in the selected folder, and
the accessing image selecting instruction information indicating that the accessing image has been selected;
sending the second selection screen data, generated by the generating second selection screen data, to the image processing device; and
executing a process for causing the image processing device to acquire selected image data in a case where image data selecting instruction information is received from the image processing device that is a destination of the second selection screen data, the image data selecting instruction information indicating that the one image data has been selected.

* * * * *